US012473749B2

(12) United States Patent
Lin

(10) Patent No.: US 12,473,749 B2
(45) Date of Patent: Nov. 18, 2025

(54) MEMORY COMBINATION LOCK

(71) Applicant: Yu-Pin Lin, Tainan (TW)

(72) Inventor: Yu-Pin Lin, Tainan (TW)

( * ) Notice: Subject to any disclaimer, the term of this patent is extended or adjusted under 35 U.S.C. 154(b) by 209 days.

(21) Appl. No.: 18/495,764

(22) Filed: Oct. 27, 2023

(65) Prior Publication Data

US 2025/0137292 A1 May 1, 2025

(51) Int. Cl.
*E05B 37/02* (2006.01)

(52) U.S. Cl.
CPC .................................... *E05B 37/02* (2013.01)

(58) Field of Classification Search
CPC ...... E05B 37/02; E05B 37/0058; E05B 37/04; Y10T 70/7299; Y10T 70/7305; Y10T 70/7288; Y10T 70/7412; Y10T 70/7418
USPC .......................................... 70/331, 332, 312
See application file for complete search history.

(56) References Cited

U.S. PATENT DOCUMENTS

| | | | | | |
|---|---|---|---|---|---|
| 5,636,539 | A * | 6/1997 | Tsai | E05B 37/02 70/315 |
| 5,899,099 | A * | 5/1999 | Tsai | E05B 37/10 70/30 |
| 6,209,368 | B1 * | 4/2001 | Lee | E05B 37/025 70/315 |
| 6,386,005 | B1 * | 5/2002 | Kuo | E05B 37/025 70/30 |
| 6,422,051 | B1 * | 7/2002 | Kuo | E05B 67/003 70/323 |
| 6,845,643 | B2 * | 1/2005 | Tsai | E05B 37/0031 70/315 |
| 2010/0192641 | A1 * | 8/2010 | Nave | E05B 67/22 70/284 |
| 2017/0114567 | A1 * | 4/2017 | Taylor | E05B 37/0058 |

FOREIGN PATENT DOCUMENTS

| | | | | |
|---|---|---|---|---|
| CN | 115263085 B | * 12/2023 | E05B 37/02 |
| DE | 102014109224 A1 | * 1/2016 | E05B 37/0058 |
| WO | WO-2010118805 A1 | * 10/2010 | E05B 37/02 |

* cited by examiner

*Primary Examiner* — Suzanne L Barrett

(57) ABSTRACT

The invention provides a memory combination lock, which includes a lock base, a set knob, a stopper, a set of dial unit, a spring, a spindle and a upper case, wherein, the set of the dial unit having several rotary disks, lock bushings and limit plates. A small through hole with an opening is disposed in the lock busing. A corresponding groove on outer wall of the lock bushing is corresponding to the opening. An inlay protruding from a passing hole respectively on the limit plates is embedded in the corresponding groove of lock bushings. There are ten types of limit plates with a limit protrusion respectively disposed on the outer wall thereof and the position of the protrusion is corresponding to one of the ten digits (0~9) on rotary discs so a set of inner codes is set by a combination of the limit plates with locking bushings.

7 Claims, 16 Drawing Sheets

MEMORY COMBINATION LOCK

BACKGROUND OF THE PRESENT INVENTION

Field of Invention

The present invention relates to a memory combination lock, in particular to a combination lock structure that can retrieve the original set code.

Description of Related Arts

The combination lock is a type of lock commonly used on door locks, bicycle locks, suitcases, safes and other items. The lock can be opened without a matching key to prevent from the trouble caused by the key losing while opening the lock. However, general combination locks do not have a design for users to retrieve the correct code. When users forget the code, they must blindly attempt different combinations based on their impression, or directly destroy the lock. In doing so, the lock becomes unusable. Alternatively, users can seek the assistance of a professional locksmith to decode, allowing it to be used again. However, this method is time-consuming and labor-intensive, and users often need to pay extra costs, thus causing trouble in use.

A conventional combination lock generally includes a lock shell and a dial unit. The dial unit is arranged in the lock shell. The dial unit is composed of a spindle, a plurality of lock bushings, and a plurality of rotary disks. The lock bushing is arranged on the spindle and can limit the expansion and contraction of the spindle. The hole in the middle of the lock bushing has a gap for the protrusion on the spindle to pass through, and the rotary disk is arranged on the lock bushing and can rotate together with the lock bushing. When the rotary disk is spun, the lock bushing can rotate relative to the spindle. When spinning the rotary disks on the combination lock to the set code, the gaps on each lock bushing will be arranged in a row, which can release the axial limit between the lock bushing and the spindle, allowing the protrusion of the spindle to pass through the gap in the lock bushing and slide axially in the lock bushing, thereby unlocking the spindle. However, in order to facilitate the assembly of each lock bushing and each rotary disk, the conventional dial unit has a corresponding groove on the outer wall surface of each lock bushing as a mark, which is convenient for the assembler to align and assemble. Moreover, the gaps and grooves of each lock bushing are set at the same position, which is convenient to manufacture and assemble, but it is easy to be deciphered. The deciphering method is as shown in the video on the internet (how to pick a realtor lock box: https://www.V=JM44uRI3rLo), a thin-plate probing tool is used to extend into the aperture between the rotary disk and the lock shell, so that the end of the probing tool is pressed against the outer peripheral surface of the lock bushing, and then by rotating the rotary disk and sensing whether the probe tool sinks, and when the probing tool sinks, it can be inferred that it is the groove part of the lock bushing. Then follow this principle to peek into the grooves of the next lock bushing one by one. After all the grooves of the lock bushings are aligned, the gaps of all the locking bushings will also be aligned. Then move all the rotary disks one by one to drive the lock bushings to rotate together until the gap of each lock bushing aligns with the protrusion on the spindle. The protrusion of the spindle can pass through the gap in the lock bushing and move axially within the lock bushing, thereby unlocking the spindle. This video is published on the internet, so that most combination locks can be easily cracked.

SUMMARY OF THE PRESENT INVENTION

The main purpose of the present invention is to provide a memory combination lock that can effectively solve the drawbacks of conventional combination locks during use.

The memory combination lock of the present invention includes:

a lock base, wherein the lock base has an accommodating groove arranged thereon, the lock base has a recessed groove provided at one end thereof, the accommodating groove of the lock base has a first protruding body protruding therein at a position corresponding to the recessed groove, an inner wall of the recessed groove has a first through hole disposed thereon and two insertion slots oppositely disposed thereon, the first through hole and the two insertion slots are connected with the accommodating groove, the lock base has a notch disposed thereon and connected with the first through hole, the accommodating groove of the lock base has a second protruding body located inwardly at a position corresponding to the first protruding body, the second protrusion has a second through hole disposed therein, the second through hole has a slot disposed thereon;

a set knob, located in the recessed groove of the lock base, wherein the set knob has a convex lump disposed on an outer end surface thereof, the convex lump has a cut slot arranged thereon, the set knob has a restricting protrusion additionally provided on the outer end surface thereof, the set knob has two guide cut slots arranged oppositely on the other end thereof, and one side of the two guide cut slots is set as an arc cut surface;

a stopper, sleeved on the first protruding body of the lock base, wherein the stopper has a through-hole disposed thereon, the stopper has two guide tabs protruding from one end thereof oppositely, the two guide tabs are respectively inserted into the two insertion slots of the lock base and are arranged in the two guide cut slots of the set knob, the opposite side edges of the two guide tabs are formed as arc surfaces, the stopper has positioning cut slots relatively arranged on a wall thereof, and one of the positioning cut slots is aligned with the notch of the lock base;

a set of dial units, arranged in the accommodating groove of the lock base, wherein the set of dial units is composed of several rotary disks, several lock bushings and several limit plates, each of the rotary disks has ten digits (0~9) evenly surrounding an outer wall thereof, a plurality of positioning stuck slots arranged around one end of an inner wall surface thereof, a recessed slot provided at the other end thereof, and a penetration hole disposed in the middle thereof; each of the lock bushings located in each of the rotary disks has a large diameter wall and a small diameter wall respectively provided on an outer wall surface thereof, which means the small diameter wall is penetrated through the penetration hole of the rotary disks, a big through hole and a small through hole respectively disposed therein, which means the small through hole has an opening disposed thereon, a corresponding groove provided on the outer wall surface thereof at a position corresponding to the opening and several position protrusions arranged on the outer wall surface thereof for being snapped into the positioning stuck slots of the rotary disk, each of the limits plates placed along one side of the rotary disk is designed in ten types and has a passing hole in the middle thereof, an inlay embedded on the limit plates and protruded from the passing hole thereof is engaged into a corresponding groove of the lock bushings, and a limit protrusion disposed on an outer peripheral wall of the limit plates respectively according to the position of one out of the ten digits (0~9) on the rotary disks, so that the limit protrusions of the ten limit plates can correspond to the positions of the ten digits on the rotary disks respectively, each of the limit plates is partially inserted in the recessed slot of each of the rotary disks, a spring, sleeved on the second protruding body of the lock base;

a spindle, passed through the stopper and the set of the dial units, wherein the spindle has a push block protrudingly disposed thereon, the push block has a limiting convex strip provided on one side thereof, and the limiting convex strip has several cut grooves provided thereon; and an upper case, covered on the lock base, wherein the upper case has a chute for the push block of the spindle to pass through and provided on a top surface thereof, the upper case has a through opening provided on the top surface thereof corresponding to the position of each of the rotary disks of the set of dial units, the upper case has a penetration opening provided on one end surface thereof, the penetration opening of the upper case is used for the convex lump of the set knob to pass through, the upper case has an arc groove provided on an inner wall thereof, the arc groove is used for inserting the restricting protrusion of the set knob.

According to the memory combination lock of the present invention, the lock base has several protrusions equidistantly disposed in the accommodating groove thereof, wherein a limiting groove is formed between the protrusion and the protrusion in order to locate the rotary disks respectively.

According to the memory combination lock of the present invention, the lock base has a positioning groove provided at a bottom thereof, wherein the upper case has a positioning inlay disposed on an inner wall surface thereof corresponding to the positioning groove of the lock base.

According to the memory combination lock of the present invention, the positions of the limit protrusions of the ten types of limit plates are respectively: the limit protrusion of the first limit plate corresponds to the position of the digit (1) on the rotary disk, the limit protrusion of the second limit plate corresponds to the position of the digit (2) on the rotary disk, the limit protrusion of the third limit plate corresponds to the position of the digit (3) on the rotary disk, the limit protrusion of the fourth limit plate corresponds to the position of the digit (4) on the rotary disk, the limit protrusion of the fifth limit plate corresponds to the position of the digit (5) on the rotary disk, the limit protrusion of the sixth limit plate corresponds to the position of the digit (6) on the rotary disk, the limit protrusion of the seventh limit plate corresponds to the position of the digit (7) on the rotary disk, the limit protrusion of the eighth limit plate corresponds to the position of the digit (8) on the rotary disk, the limit protrusion of the ninth limit plate corresponds to the position of the digit (9) on the rotary disk, the limit protrusion of the tenth limit plate corresponds to the position of the digit (0) on the rotary disk.

According to the memory combination lock of the present invention, the lock bushing has at least one pseudo corresponding groove disposed on the small diameter wall thereof.

According to the memory combination lock of the present invention, the upper case has corresponding marks arranged between the through openings on the top surface thereof.

According to the memory combination lock of the present invention, the upper case has a lock serial number arranged thereon.

The advantage of the memory combination lock of the present invention is that each combination lock is equipped with a set of inner codes by utilizing the different corresponding positions of the limit protrusions and inlays of the ten types of limit plates. Even if a thief peeks into the corresponding groove or pseudo corresponding groove on the lock bushing in the combination lock, he/she still cannot guess the exact position of the opening in the lock bushing and cannot unlock it, which can effectively achieve an anti-theft effect. Additionally, each combination lock has its own inner codes, which can be used to retrieve its unlocking password, ensuring the safety of the lock.

DETAILED DESCRIPTION OF THE PREFERRED EMBODIMENT

Figure 1:
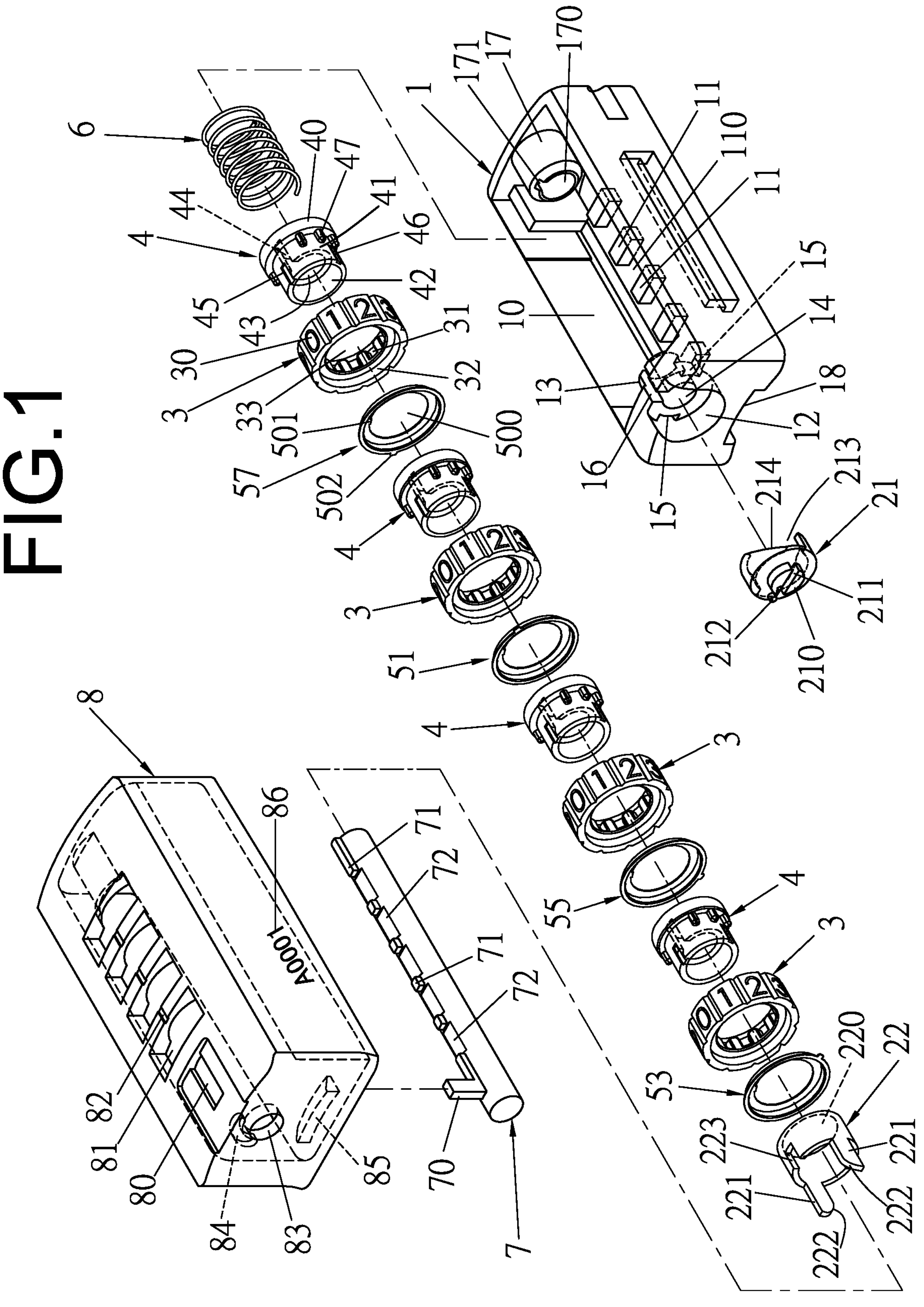
FIG. 1 is an exploded perspective view of an embodiment of the present invention.
Figure 2:
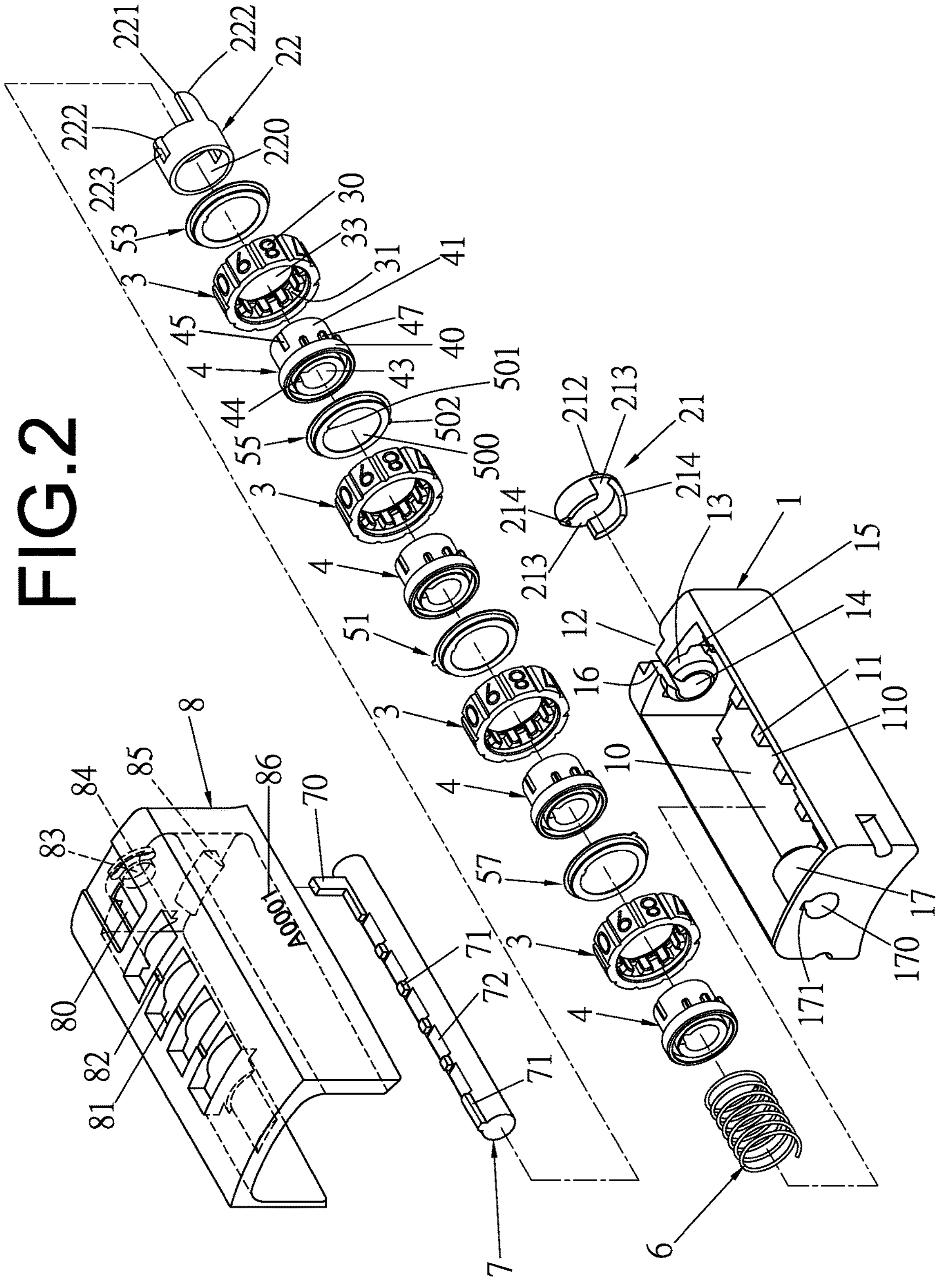
FIG. 2 is an exploded perspective view from another angle of the embodiment of the present invention.
Figure 3:
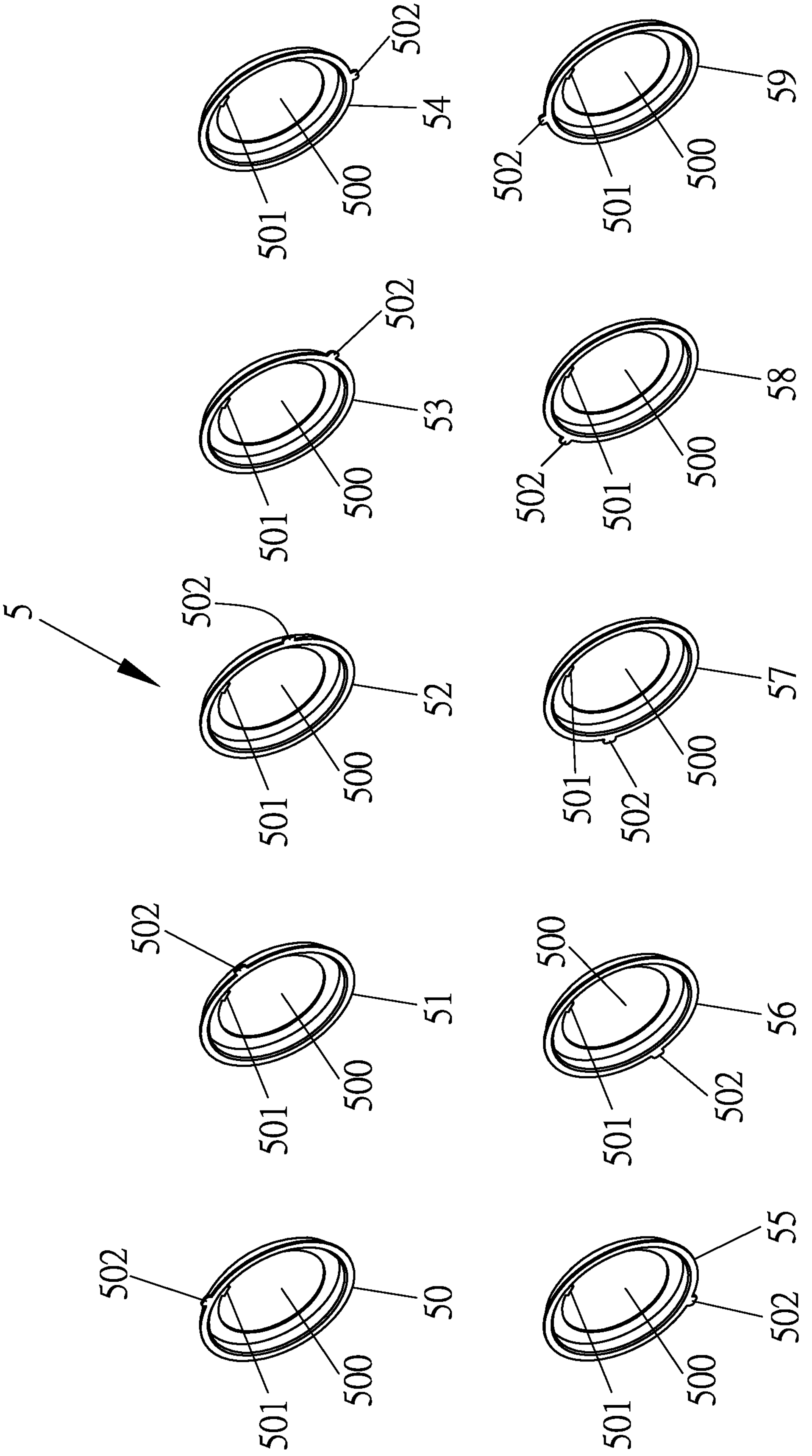
FIG. 3 is a perspective view of the limit plates according to the embodiment of the present invention.
Figure 4:
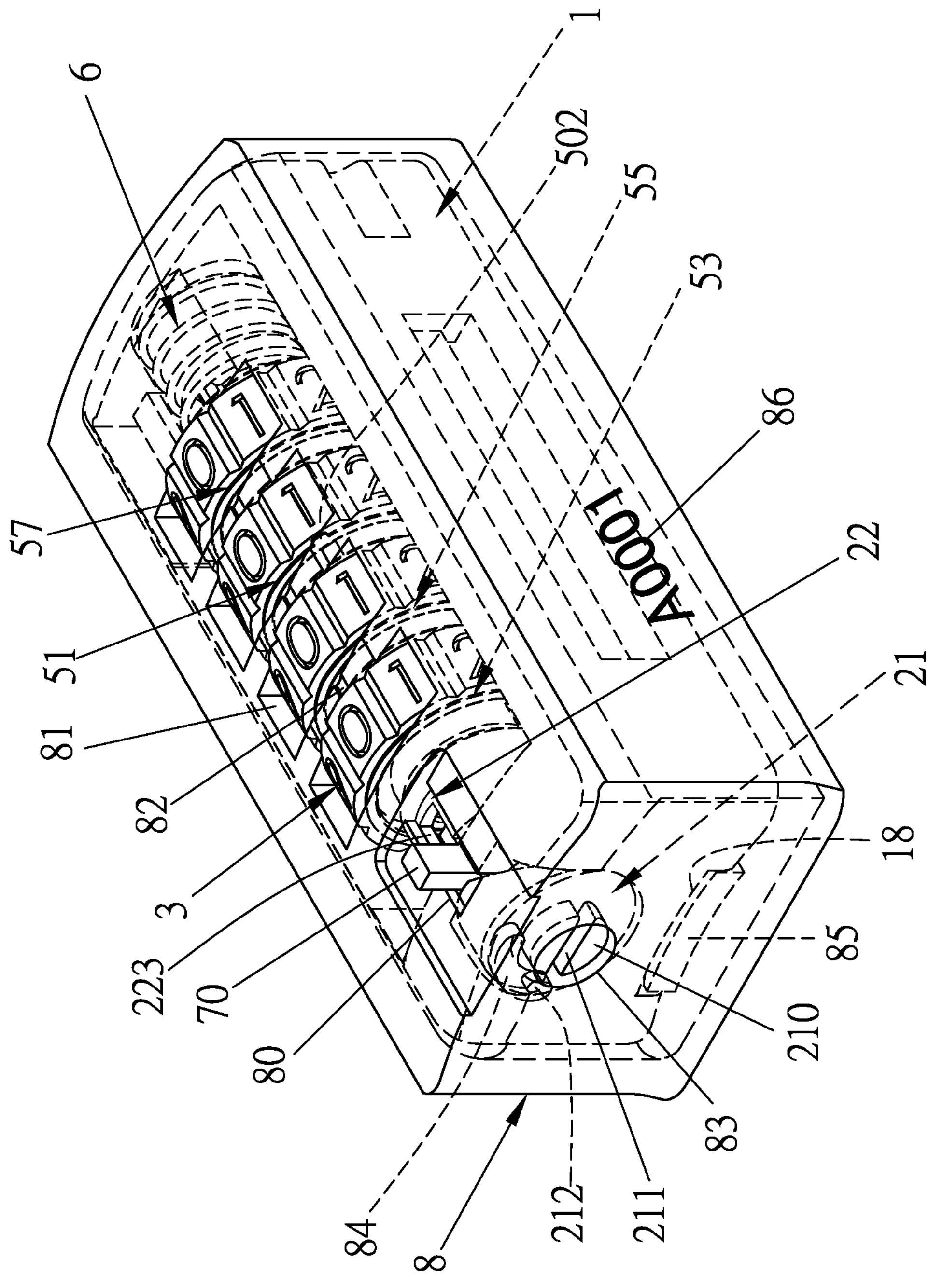
FIG. 4 is a perspective assembly view of the embodiment of the present invention.

In order to achieve the above-mentioned objects and effects of the present invention, the technical means adopted are hereby enumerated through a preferred feasible embodiment, and illustrated in the drawings, detailed as follows:

According to an embodiment of the present invention, please refer to FIGS. 1-3, a memory combination lock mainly includes: a lock base 1, wherein the lock base 1 has an accommodating groove 10 arranged thereon, the accommodating groove 10 has several protrusions 11 equidistantly arranged thereon, a limiting groove 110 is formed right between two of the protrusions 11, the lock base 1 has a recessed groove 12 provided at one end thereof, the accommodating groove 10 of the lock base 1 has a first protruding body 13 protruding therein at a position corresponding to the recessed groove 12, an inner wall of the recessed groove 12 has a first through hole 14 disposed thereon and two insertion slots 15 oppositely disposed thereon, the first through hole 14 and the two insertion slots 15 are connected with the accommodating groove 10, the lock base 1 has a notch 16 disposed thereon and connected with the first through hole 14, the accommodating groove 10 of the lock base 1 has a second protruding body 17 located inwardly at a position corresponding to the first protruding body 13, the second protrusion 17 has a second through hole 170 disposed therein, the second through hole 170 has a slot 171 disposed thereon, the lock base 1 has a positioning groove 18 provided at a bottom thereof; a set knob 21, located in the recessed groove 12 of the lock base 1, wherein the set knob 21 has a convex lump 210 disposed on an outer end surface thereof, the convex lump 210 has a cut slot 211 arranged thereon, the set knob 21 has a restricting protrusion 212 additionally provided on the outer end surface thereof, the set knob 21 has two guide cut slots 213 arranged oppositely on the other end thereof, one side of the two guide cut slots 213 is set as an arc cut surface 214; a stopper 22, arranged in the accommodating groove 10 of the lock base 1 and sleeved on the first protruding body 13, wherein the stopper 22 has a through-hole 220 disposed thereon, the stopper 22 has two guide tabs 221 protruding from one end thereof oppositely, the two guide tabs 221 are respectively inserted into the two insertion slots 15 of the lock base 1 and are arranged in the two guide cut slots 213 of the set knob 21, the opposite side edges of the two guide tabs 221 are formed as arc surfaces 222, the stopper 22 has positioning cut slots 223 relatively arranged on a wall thereof, and one of the positioning cut slots 223 is aligned with the notch 16 of the lock base 1; a set of dial units is arranged in the accommodating groove 10 of the lock base 1, wherein the set of dial units is composed of several rotary disks 3, several lock bushings 4 and several limit plates 5, each of the rotary disks 3 has ten digits (0~9) 30 evenly surrounding the outer wall thereof, a plurality of positioning stuck slots 31 arranged around one end of an inner wall surface thereof, a recessed slot 32 provided at the other end thereof, and a penetration hole 33 disposed in the middle thereof, each of the lock bushings 4 located in each of the rotary disks 3 has a large diameter wall 40 and a small diameter wall 41 respectively provided on the outer wall thereof which means the small diameter wall 41 is penetrated through the penetration hole 33 of the rotary disks 3, a big through hole 42 and a small through hole 43 respectively disposed therein which means the small through hole 43 has an opening 44 disposed thereon, a corresponding groove 45 provided on the small diameter wall 41 thereof at a position corresponding to the opening 44, at least one pseudo corresponding groove 46 disposed on the small diameter wall 41 thereof at a position offset from the corresponding groove 45, and several position protrusions 47 that are oppositely arranged on the small diameter wall 41 for being clamped in the positioning stuck slots 31 of the rotary disks 3, each of the limit plates 5 placed on one side of the rotary disks 3 and partially inserted in the recessed slot 32 of rotary disks 3 is designed in ten types (as shown in FIG. 3) and has a passing hole 500 disposed in the middle thereof, an inlay 501 embedded on the limit plates 5 and protruded from the passing hole 500 is engaged into a corresponding groove 45 of the lock bushings 4 thereof and a limit protrusion 502 disposed on an outer peripheral wall according to the position of one out of the ten digits (0~9) 30 on the rotary disks 3 so that the position of the limit protrusion 502 on the ten limit plates 5 can respectively correspond to the positions of the ten digits (0~9) 30 on the rotary disks 3, each of the limit plates 5 is partially inserted in the recessed slot 32 of the rotary disk 3, wherein the positions of the limit protrusions 502 of the ten types of limit plates 5 are respectively: the limit protrusion 502 of the first limit plate 51 corresponds to the position of the digit (1) on the rotary disk 3, the limit protrusion 502 of the second limit plate 52 corresponds to the position of the digit (2) on the rotary disk 3, the limit protrusion 502 of the third limit plate 53 corresponds to the position of the digit (3) on the rotary disk 3, the limit protrusion 502 of the fourth limit plate 54 corresponds to the position of the digit (4) on the rotary disk 3, the limit protrusion 502 of the fifth limit plate 55 corresponds to the position of the digit (5) on the rotary disk 3, the limit protrusion 502 of the sixth limit plate 56 corresponds to the position of the digit (6) on the rotary disk 3, the limit protrusion 502 of the seventh limit plate 57 corresponds to the position of the digit (7) on the rotary disk 3, the limit protrusion 502 of the eighth limit plate 58 corresponds to the position of the digit (8) on the rotary disk 3, the limit protrusion 502 of the ninth limit plate 59 corresponds to the position of the digit (9) on the rotary disk 3, the limit protrusion 502 of the tenth limit plate 50 corresponds to the position of the digit (0) on the rotary disk 3; a spring 6, arranged in the accommodating groove 10 of the lock base 1 and sleeved on the second protruding body 17 of the lock base 1; a spindle 7, passed through the stopper 22 and the set of dial units is arranged in the accommodating groove 10 of the lock base 1, wherein the spindle 7 has a push block 70 protrudingly disposed thereon, the push block 70 has a limiting convex strip 71 provided on one side thereof, and the limiting convex strip 71 has several cut grooves 72 provided thereon; and an upper case 8, located on the lock base 1, wherein the upper case 8 has a chute 80 for the push block 70 of the spindle 7 to pass through and provided on a top surface thereof, the upper case 8 has a through opening 81 provided on the top surface thereof corresponding to the position of the rotary disks 3 of the set of dial units is arranged in the accommodating groove 10 of the lock base 1, the upper case 8 has corresponding marks 82 arranged between the through openings 81 on the top surface thereof, the upper case 8 has a penetration opening 83 provided on one end surface thereof, the penetration opening 83 of the upper case 8 is used for the convex lump 210 of the set knob 21 to pass through, the upper case 8 has an arc groove 84 provided on an inner wall thereof, the arc groove 84 is used for inserting the restricting protrusion 212 of the set knob 21, the upper case 8 has a positioning inlay 85 disposed on the inner wall surface corresponding to the positioning groove 18 of the lock base 1, the upper case 8 has a lock serial number 86 arranged thereon; which is a memory combination lock structure.

Figure 5:
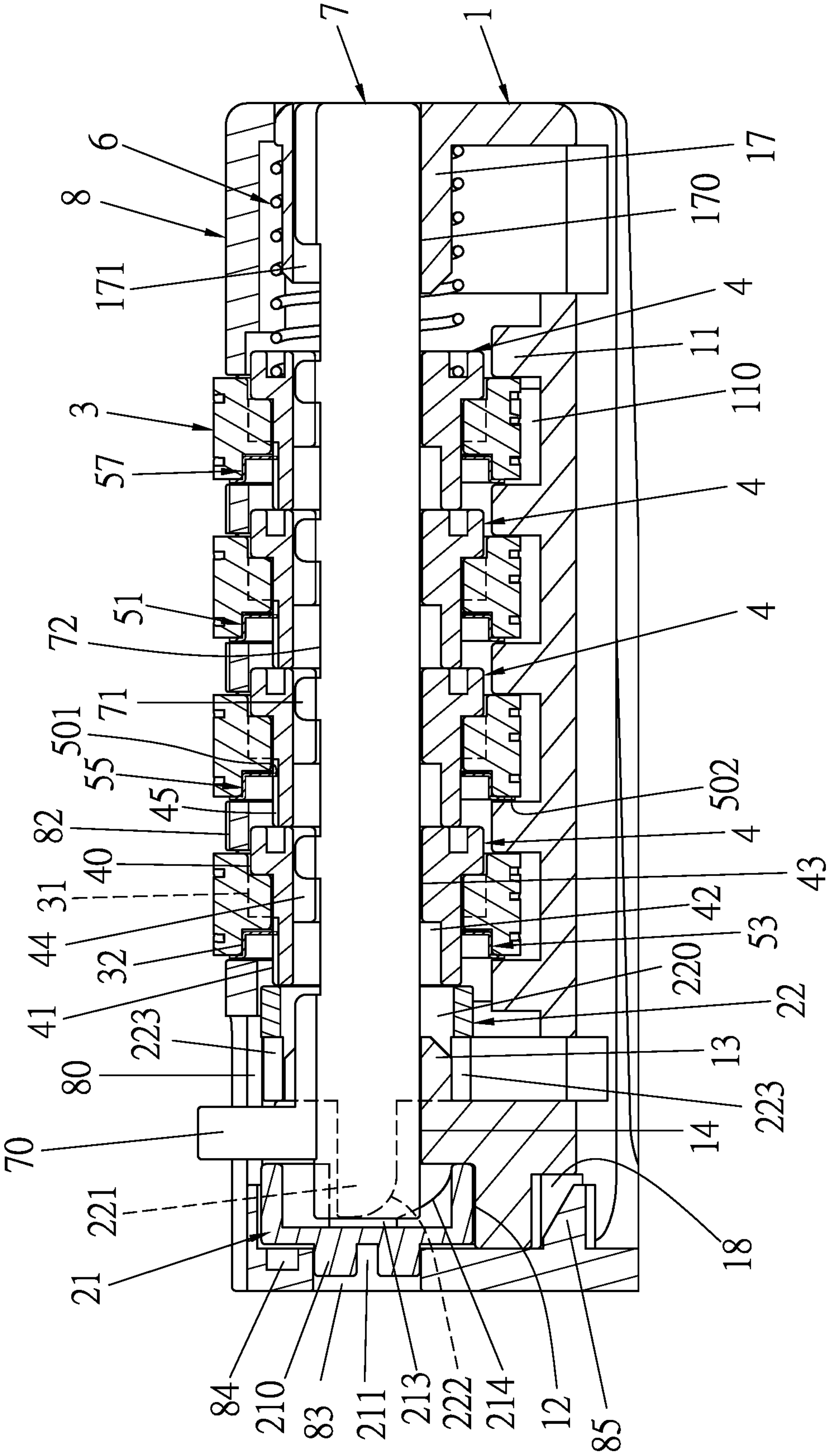
FIG. 5 is a sectional view of the embodiment of the present invention.
Figure 6:
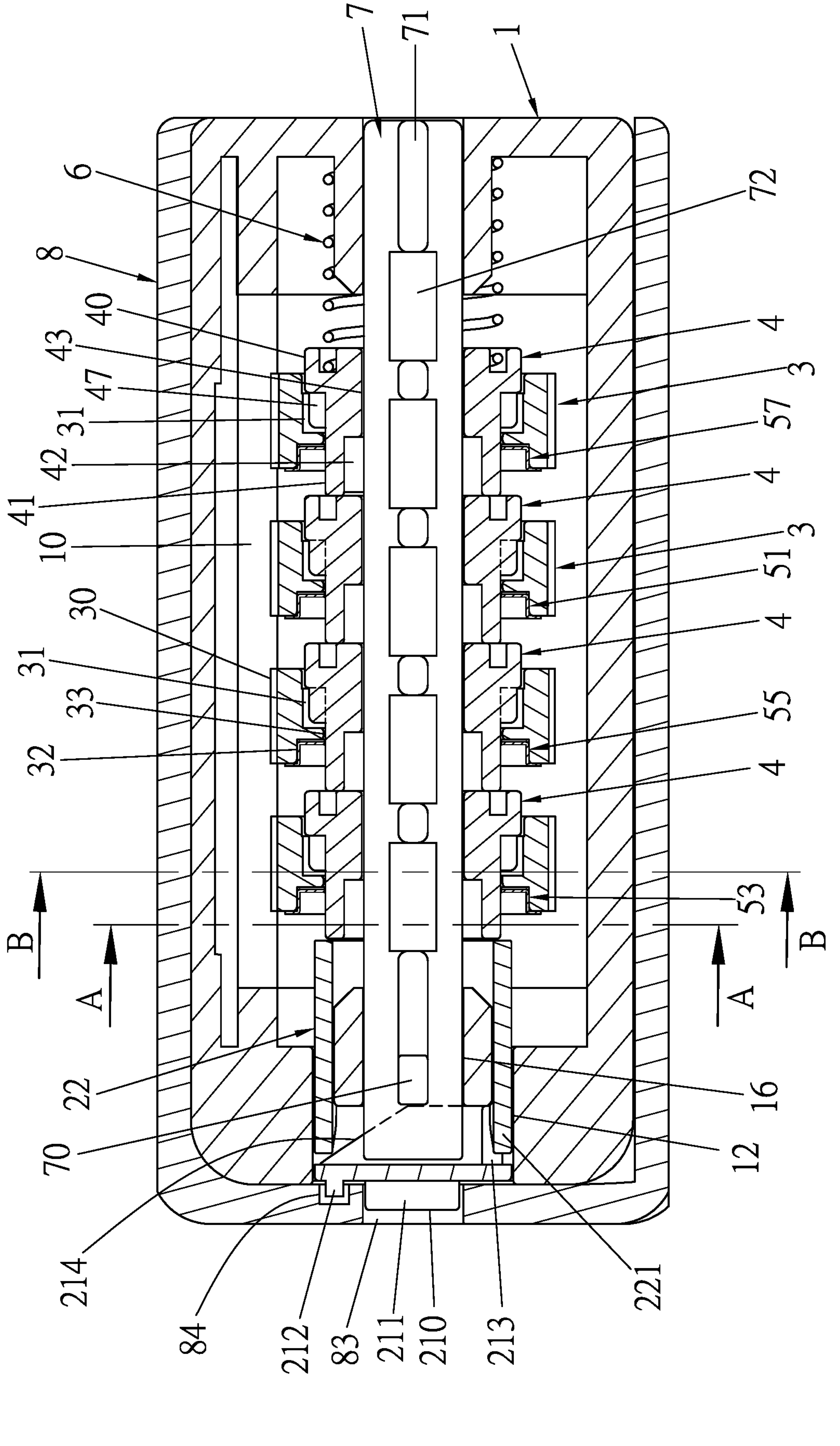
FIG. 6 is a top sectional perspective view of the embodiment of the present invention.
Figure 7:
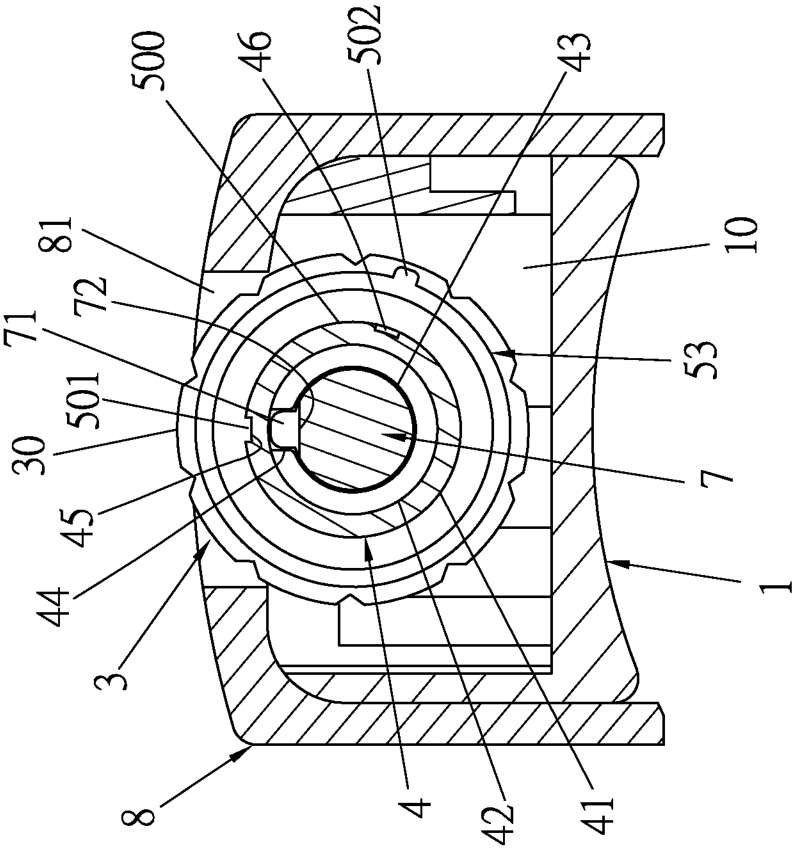
FIG. 7 is a sectional view of A-A in FIG. 6.
Figure 8:
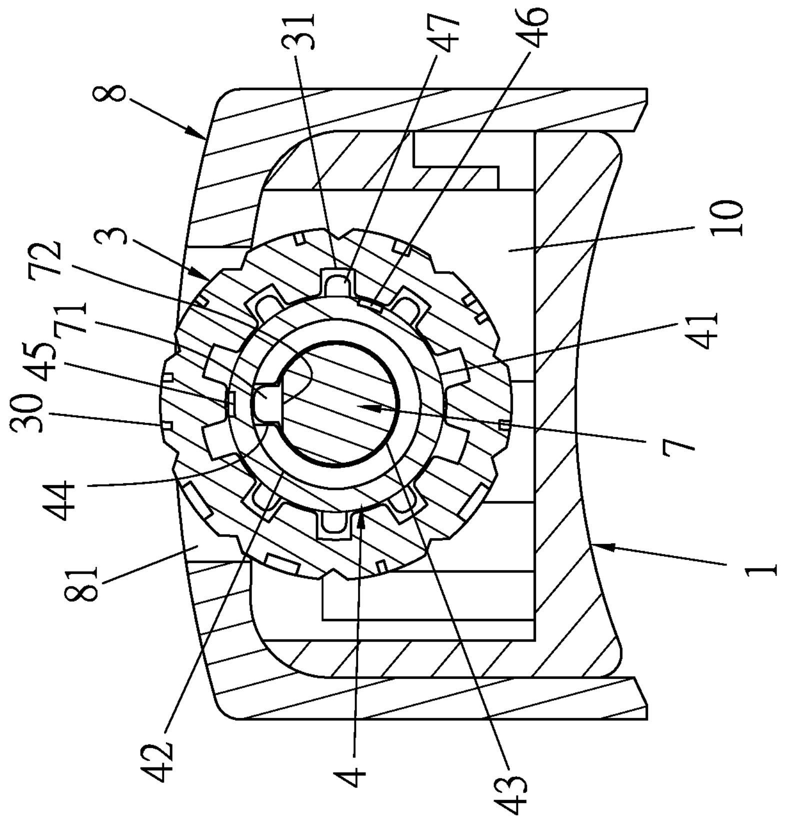
FIG. 8 is a sectional view of B-B in FIG. 6.

When assembling the embodiment of the present invention, as shown in FIGS. 1 to 8, each memory combination lock has a lock serial number 86 arranged on the upper case 8, and each lock serial number 86 is provided with a set of "inner code" which means three or four limit plates 5 and lock bushings 4 are selected randomly by the factory during assembly. In case of this embodiment has four limit plates 5 and four lock bushings 4 which are selected to be a set of the "inner codes" of the lock and the plates selection of the limit plates 5 with different position of the limit protrusions 502 in accordance with the position of one out of the ten digits (0~9) 30 on the rotary disks 3 could be the same or not. For example: as shown in FIGS. 1 and 2 of this embodiment, the third limit plate 53, the fifth limit plate 55, the first limit plate 51 and the seventh limit plate 57 in FIG. 3 are selected to combine an inner code as "3, 5, 1, 7" from left to right, of the lock due to the limit protrusions 502 of the selected four limit plates 5 correspond respectively to the corresponding grooves 45 of the lock bushings 4 assembled in the four rotary disks 3. An "outer code" can combine because the opening 44 of each of the lock bushings 4 corresponds to the top digits 30 on each of the rotary disk 3. In this embodiment, the code is set at the "0" position and the number on rotary disk 3 is the "outer code". A set of outer code of this embodiment is "0, 0, 0, 0", which is the "unlock password" of the combination lock. The small diameter wall 41 of each lock bushing 4 extends through the penetration hole 33 of each rotary disk 3. The position protrusions 47 on each lock bushing 4 are embedded in the positioning stuck slots 31 of each rotary disk 3, (as shown in FIGS. 6 and 8). In addition, the four selected limit plates 5 including the third limit plate 53, the fifth limit plate 55, the first limit plate 51 and the seventh limit plate 57, are respectively provided on one side of the four rotary disks 3. The small diameter wall 41 of each lock bushing 4 extends through the passing hole 500 of each limit plate 5. The inlay 501 of each of the limit plates 5 are respectively embedded in the corresponding groove 45 of each lock bushing 4. The stopper 22 is arranged in front of the leftmost lock bushing 4. The spindle 7 penetrates into the big through hole 42 and the small through hole 43 of each lock bushing 4 through the through-hole 220 of the stopper 22. The limiting convex strip 71 on the spindle 7 corresponds to the opening 44 of each lock bushing 4. One end of the spring 6 is placed against the rightmost lock bushing 4. Then set the spindle 7, the stopper 22 and the set of numbered rotary discs as set above together with the spring 6 into the accommodating groove 10 of the lock base 1. The other end of the spring 6 is sleeved on the second protruding body 17 of the lock base 1. The left end of the spindle 7 is inserted into the first through hole 14 of the lock base 1. The push block 70 of the spindle 7 protrudes from the notch 16 of the lock base 1. The right end of the spindle 7 is inserted into the second through hole 170 of the lock base 1. The two guide tabs 221 of the stopper 22 are respectively inserted into the two insertion slots 15 of the lock base 1. The lower end of each rotary disk 3 is respectively located in each limiting groove 110 of the lock base 1. In addition, set knob 21 is assembled in the recessed groove 12 of the lock base 1, and the two guide tabs 220 of the stopper 22 are respectively located in the guide cut slots 213 of the set knob 21, and then place the upper case 8 on the lock base 1, so that the positioning inlay 85 of the upper case 8 is embedded in the positioning groove 18 of the lock base 1. The convex lump 210 of the set knob 21 corresponds to the penetration opening 83 of the upper case 8. The restricting protrusion 212 of the set knob 21 is located in the arc groove 84 of the upper case 8. The push block 70 of the spindle 7 protrudes from the chute 80 of the upper case 8, and the upper end of each rotary disk 3 protrudes from the through opening 81 of the upper case 8. In this way, the assembly of the overall memory combination lock can be completed.

Figure 9:
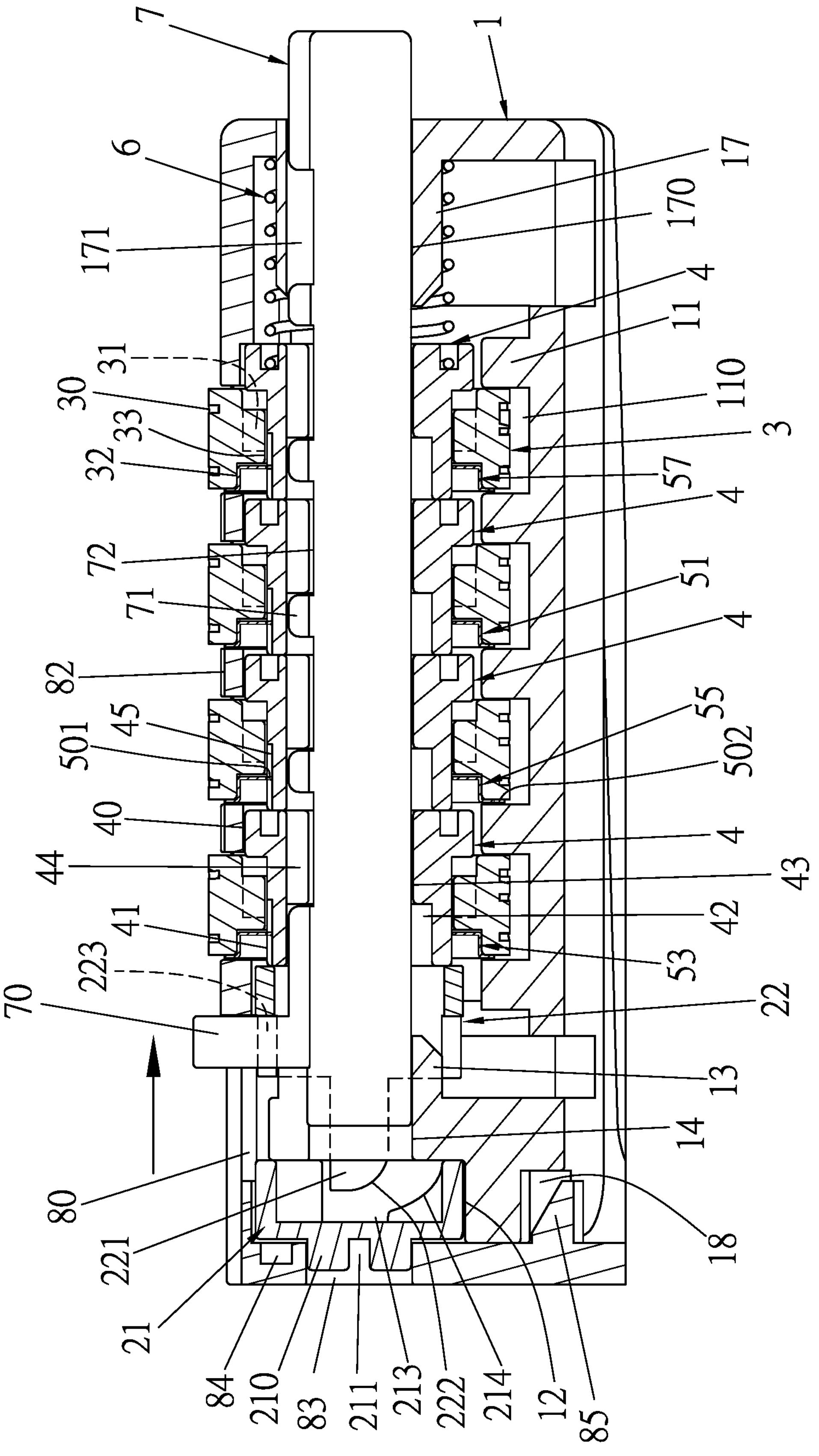
FIG. 9 is a perspective view of pushing a spindle according to the embodiment of the present invention.
Figure 10:
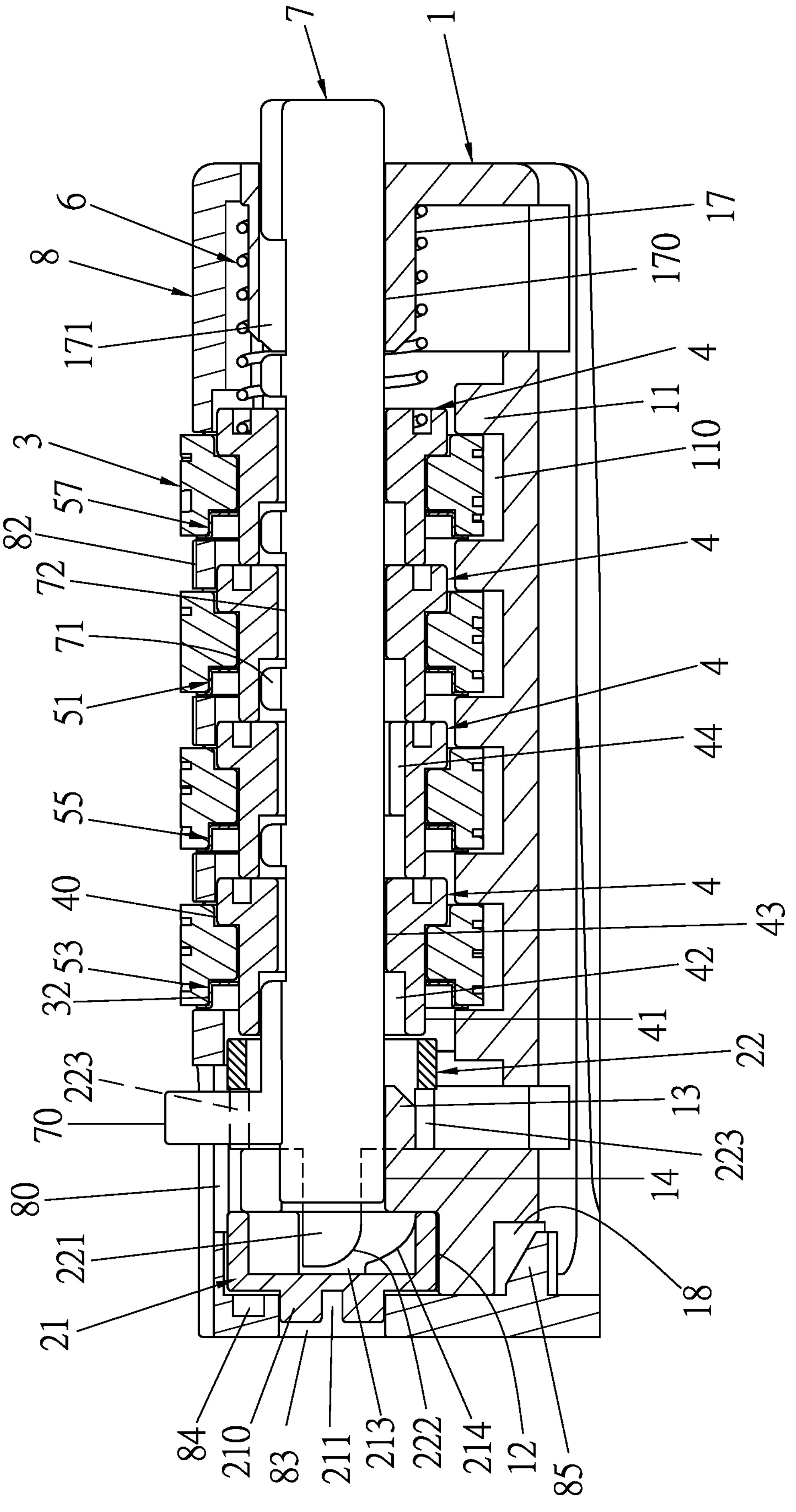
FIG. 10 is a sectional view of the embodiment of the present invention when rotating the rotary disk to drive the lock bushing to lock.

When using the present invention, referring to FIGS. 4 to 10, and assemble the combination lock of the present invention on the items to be locked, such as door locks, bicycle locks, suitcases, safes, etc. When locking, only need to push the push block 70 of the spindle 7 to move (as shown in FIG. 9), one end of the spindle 7 will protrude from the second through hole 170 of the lock base 1. The limiting convex strip 71 of the spindle 7 is separated from the opening 44 of each lock bushing 4 and is no longer restricted by each lock bushing 4, and each rotary disk 3 can be rotated to generate random numbers. Each rotary disk 3 drives the lock bushing 4 to rotate, and the lock bushing 4 drives the limit plate 5 to rotate together, causing the opening 44 of each lock bushing 4 to rotate, and no longer align the limiting convex strip 71 of the spindle 7 (as shown in FIG. 10), so that the spindle 7 is locked and not retracted. In this way, the items that need to be locked can be locked, and the locking action is completed.

When unlocking, only need to rotate each rotary disk 3 so that the digit 30 on each rotary disk 3 is the password set for the lock (the unlocking password in this embodiment is "0, 0, 0, 0"). The openings 44 of each of the lock bushings 4 are aligned with each other again, and the openings 44 are aligned with the limiting convex strips 71 of the spindle 7. The spindle 7 is no longer restricted by the lock bushing 4, but can be axially retracted to form an unlocking state (as shown in FIG. 6). In this way, the unlocking action can be completed.

Figure 11:
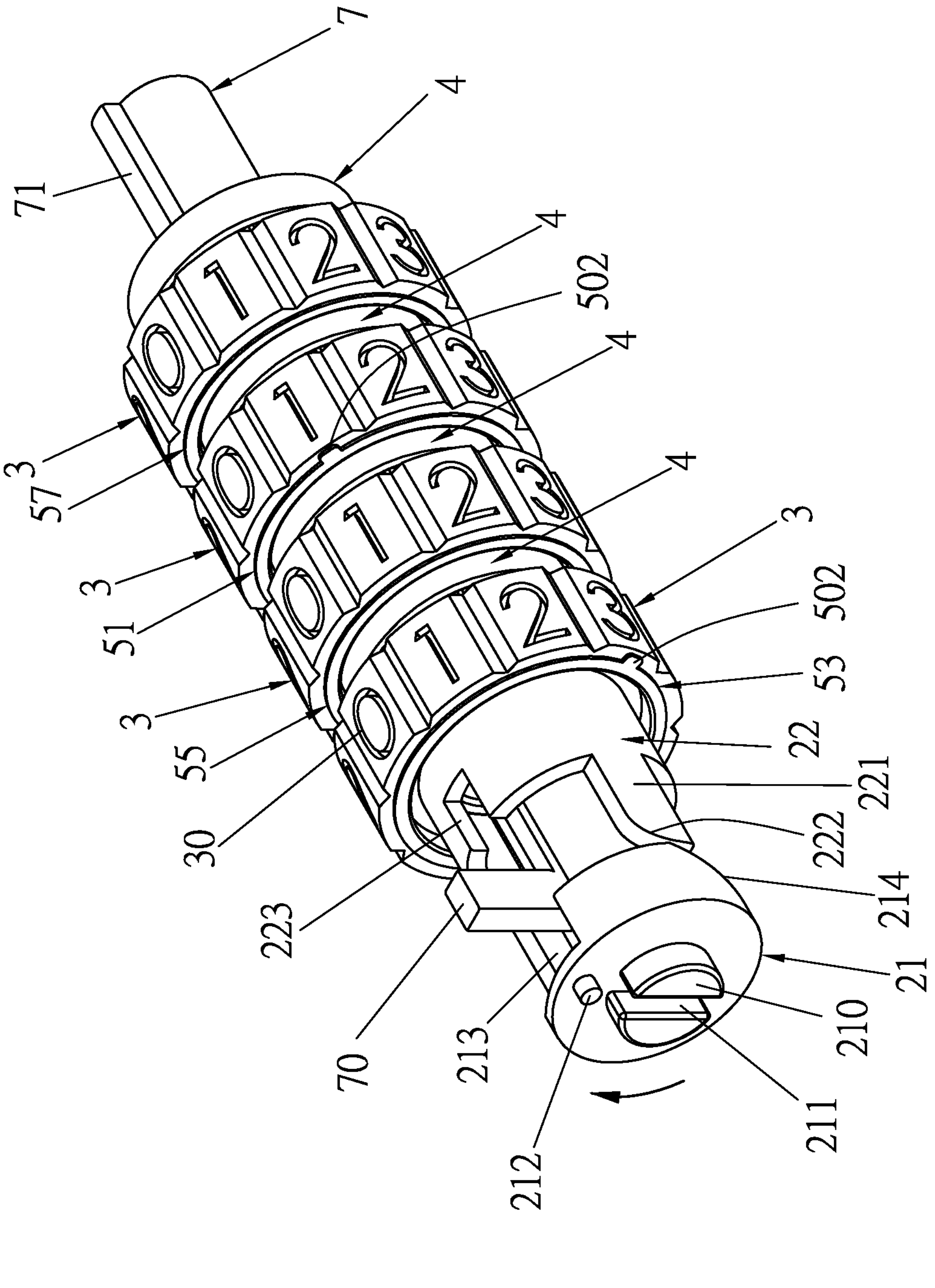
FIG. 11 is a perspective view of a set knob rotated inside the lock according to the embodiment of the present invention.
Figure 12:
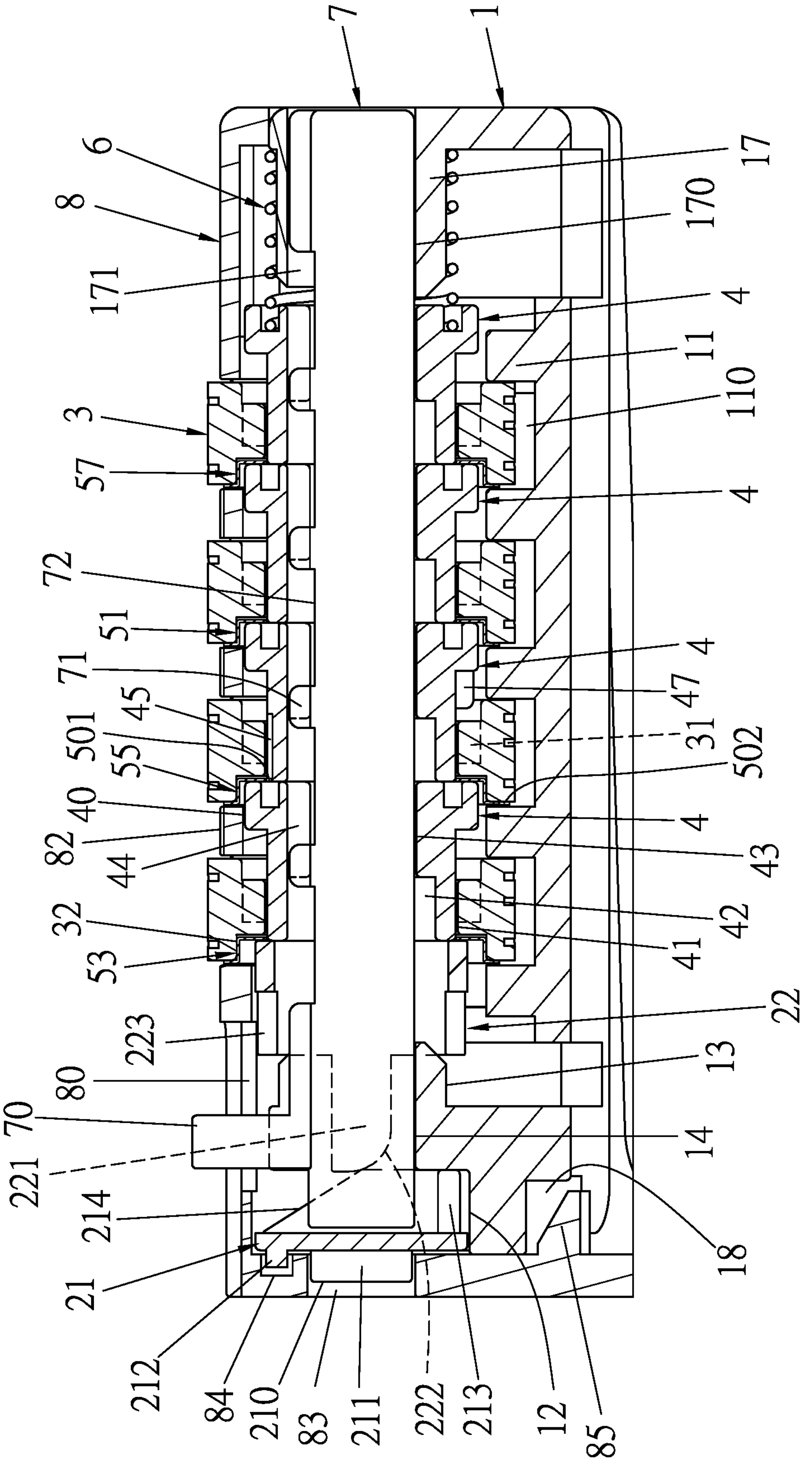
FIG. 12 is a perspective view of rotating a set knob and pushing a lock bushing away from the rotary disk buckle according to an embodiment of the present invention.

When changing the password in the embodiment of the present invention, referring to FIGS. 11 and 12. It is only necessary to insert a tool into the cut slot 211 on the convex lump 210 of the set knob 21 to rotate the set knob 21, and the restricting protrusion 212 on the set knob 21 rotates within the arc groove 84 of the upper case 8. The arc surfaces 222 of the two guide tabs 221 of the stopper 22 is pushed to the right along the arc cut surface 214 of the set knob 21 by the rotation of the set knob 21. The stopper 22 pushes against each lock bushing 4 and moves to the right, and pushes against the spring 6 in an elastically compressed state. The position protrusions 47 of each of the lock bushings 4 are separated from the positioning stuck slots 31 of each of the rotary disks 3 (as shown in FIG. 12), so that each rotary disk 3 is no longer restricted by the spindle 7 and the lock bushing 4 and can rotate, and the desired password of the lock can be freely set. When each rotary disk 3 rotates to the desired password, use a tool to rotate the set knob 21 back to an original position, so that the stopper 22 is no longer blocked by the arc cut surface 214 of the set knob 21, and the spring 6 is elastic recovery (as shown in FIG. 5). Each lock bushing 4 and the stopper 22 are axially pushed back to the original position, and the position protrusions 47 of each lock bushing 4 are again locked in the positioning stuck slots 31 of each rotary disk 3. The guide tabs 221 of the stopper 22 are again located in the guide cut slots 213 of the set knob 21. In this way, the number changing setting of the memory combination lock can be completed.

Each memory combination lock of the present invention is provided with a set of "inner codes" with the product. The user can save or record the "inner codes" for emergencies.

Figure 13:
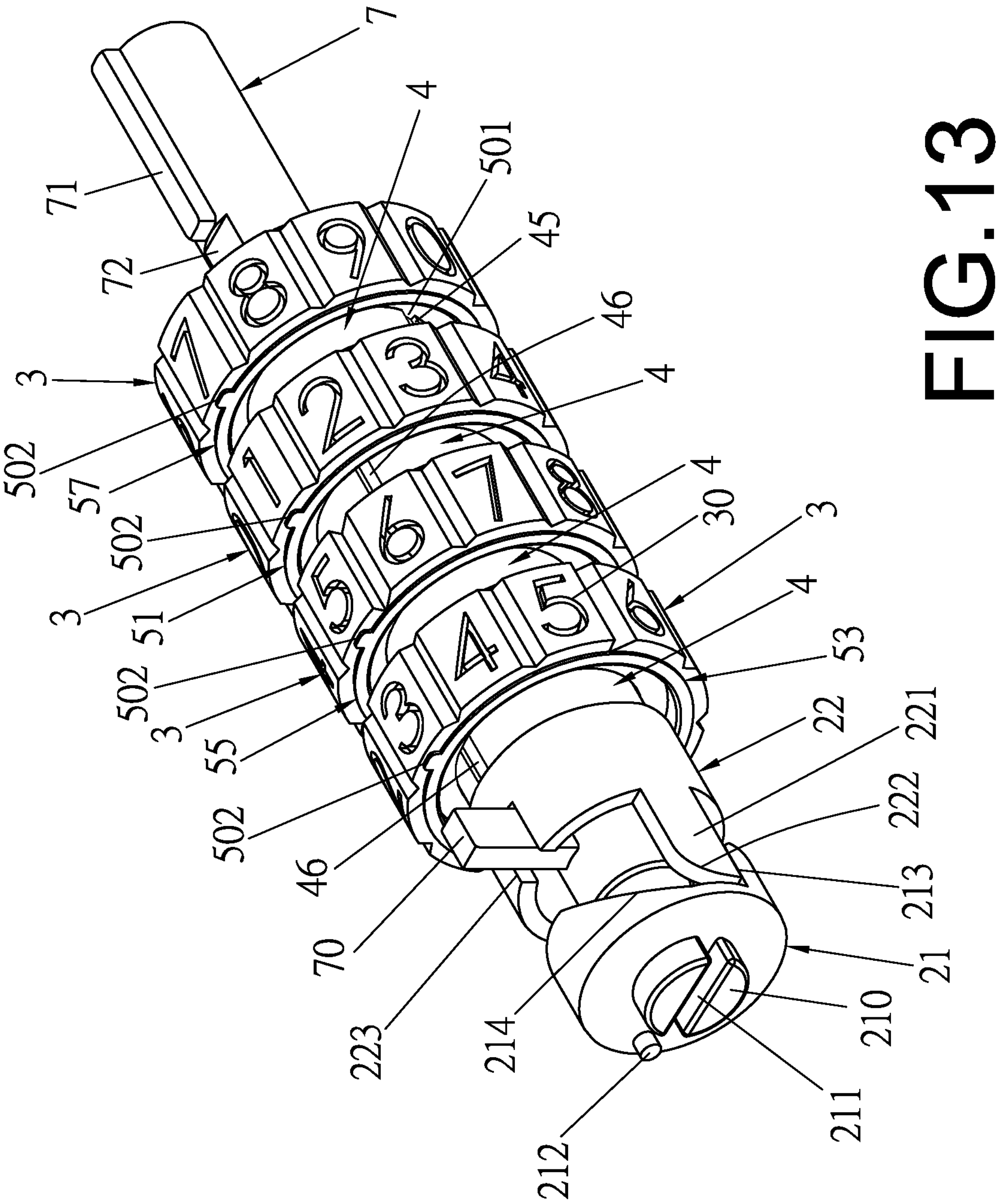
FIG. 13 is an internal perspective view of the embodiment of the present invention in which the limit protrusions of the limit plates are rotated upward to align with each other by rotating the rotary disk.
Figure 14:
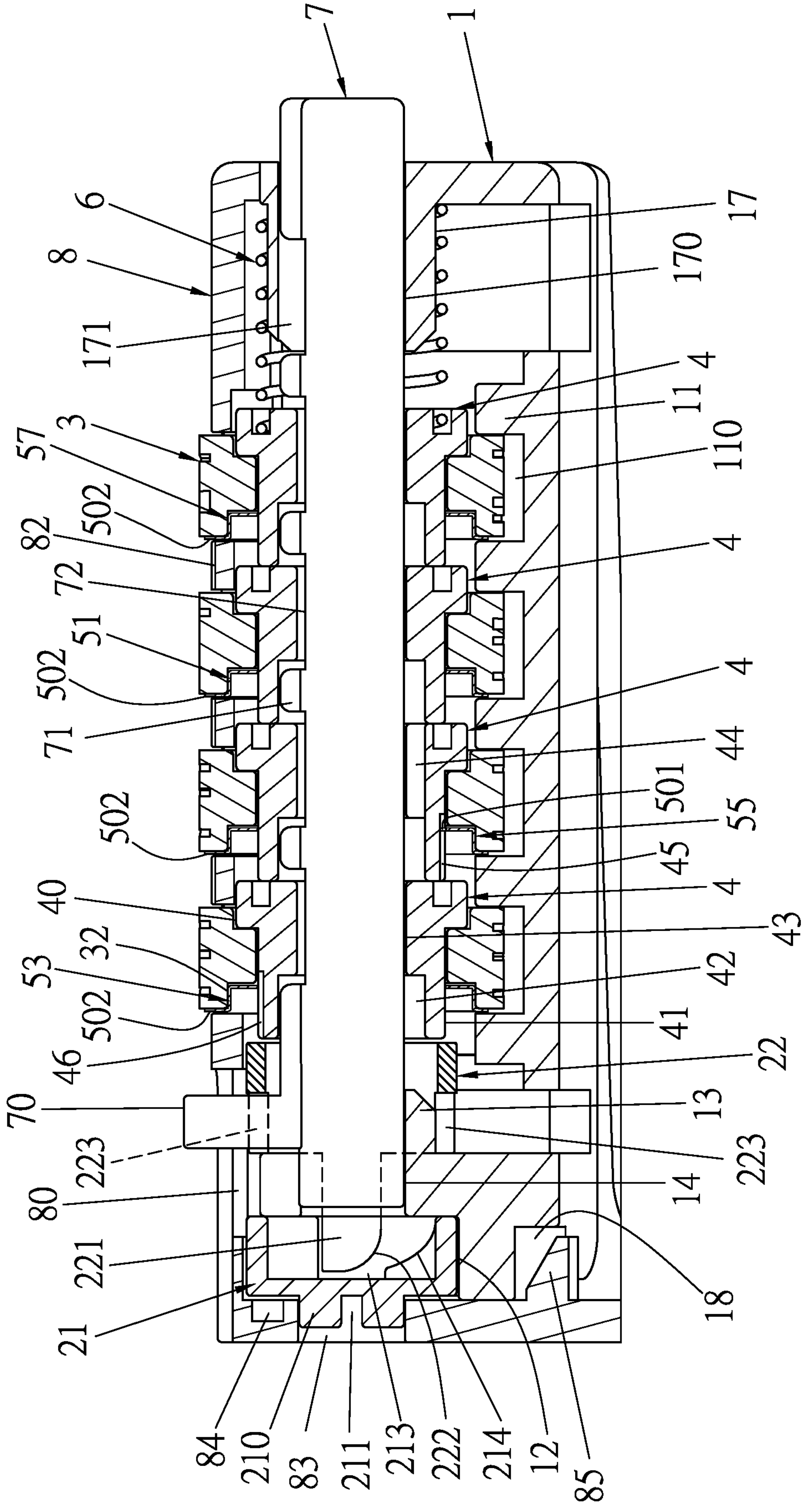
FIG. 14 is a sectional view of each limit plate aligned upward according to the embodiment of the present invention.
Figure 16:
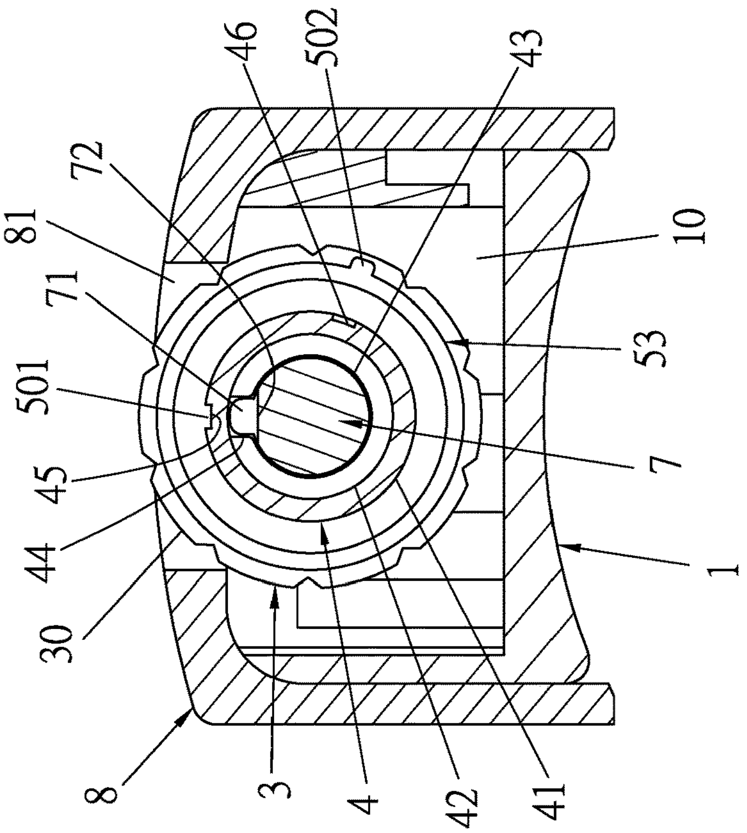
FIG. 16 is a sectional view of FIG. 15 in which the rotary disk is rotated to drive the lock bushing so that the opening is aligned with the limiting convex strip of the spindle to retrieve the original password.
Figure 15:
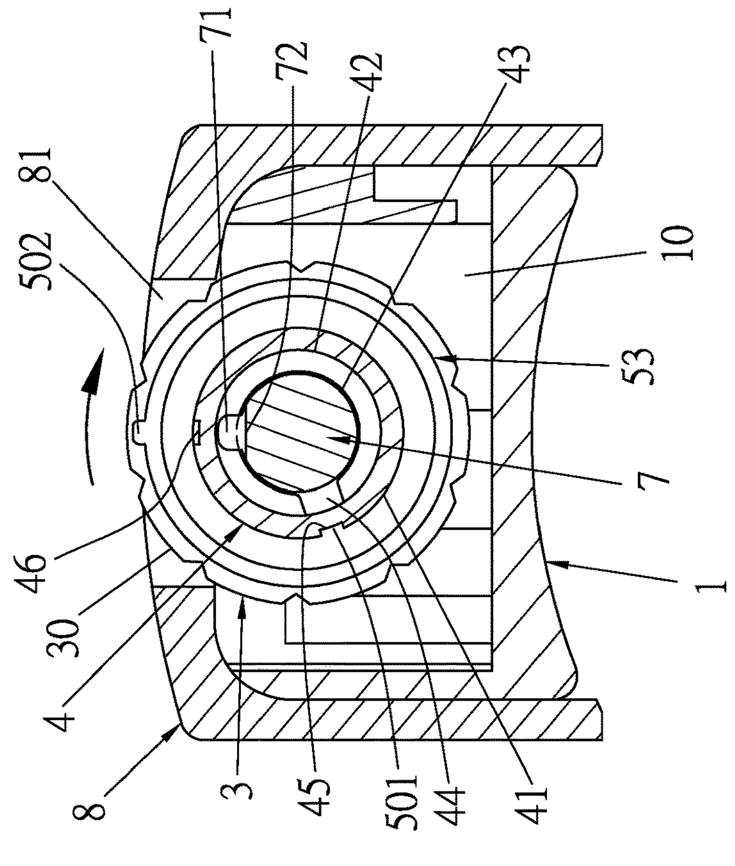
FIG. 15 is a sectional view of the combination of the third limit plate and the lock bushing of FIG. 13.
Figure 18:
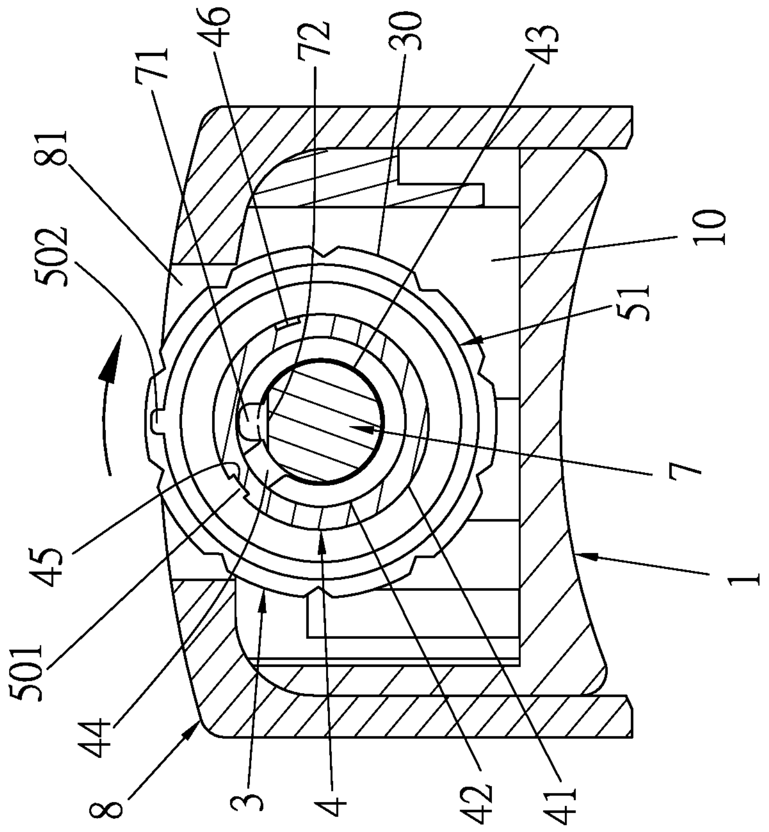
FIG. 18 is a sectional view of the combination of the first limit plate and the lock bushing of FIG. 13.
Figure 17:
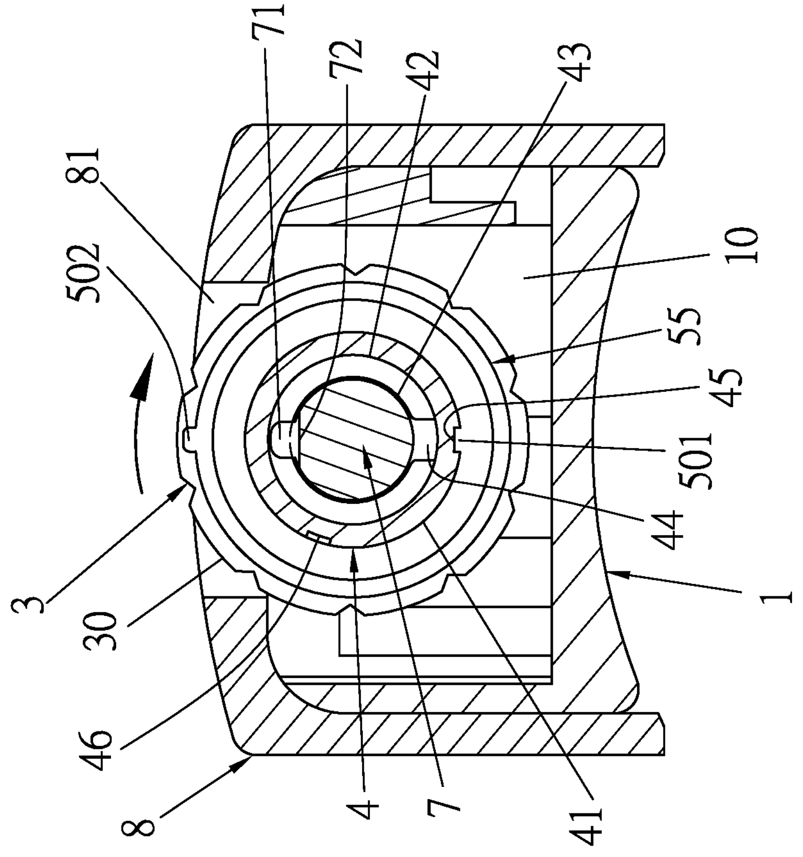
FIG. 17 is a sectional view of the combination of the fifth limit plate and the lock bushing of FIG. 13.
Figure 19:
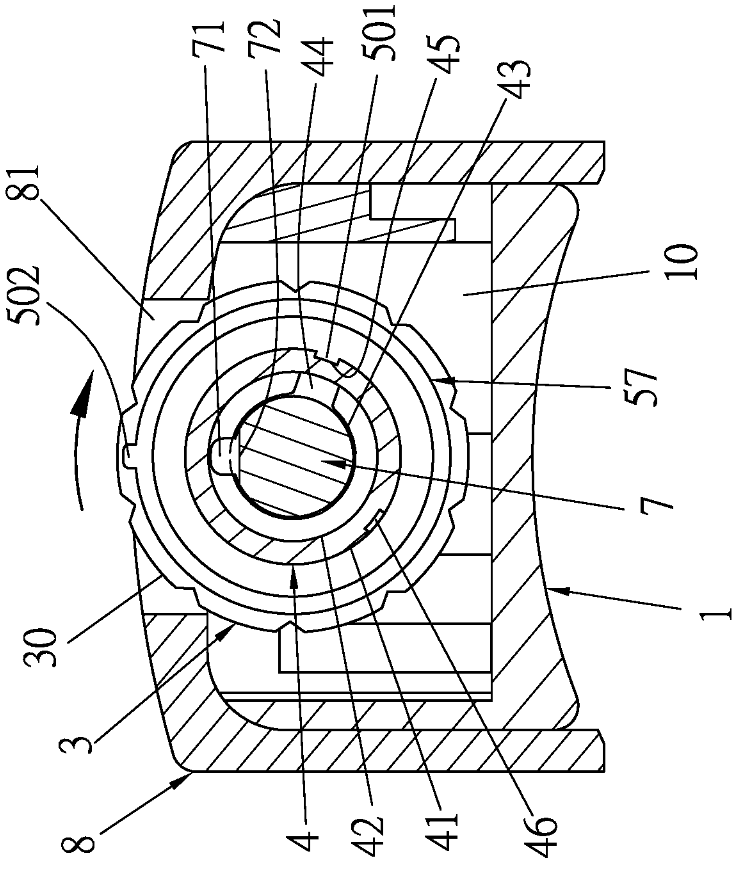
FIG. 19 is a sectional view of the combination of the seventh limit plate and the lock bushing of FIG. 13.

Consumers can also log in personal information and the lock serial number 86 online. After forgetting the password, they can call the manufacturer or log in online to check the "inner codes" of the memory combination lock. Even after changing the password, the user can successfully retrieve the original password as long as he/she remembers the "inner codes". There is no need to ask a professional to open the lock or destroy the lock, which can achieve the purpose of conveniently opening the lock and protecting the combination lock. If the user 20) forgets the password and wants to retrieve the password of the lock, referring to FIGS. 13 to 19, the user only needs to turn each rotary disk 3 of the memory combination lock so that each rotary disk 3 drives each lock bushing 4 and the limit plates 5 are rotated, and the limit protrusion 502 of each limit plate 5 corresponding to each rotary disk 3 is rotated to the top (as shown in FIGS. 13, 14 and 15), so that each limit protrusion 502 is aligned with the 25 corresponding marks 82 of the upper case 8. At this time, the digit 30 on each rotary disk 3 is not the set password. Since each lock bushing 4 is provided with a pseudo corresponding groove 46, the thief does not know whether what he finds is the corresponding groove 45 or the pseudo corresponding groove 46 on the lock bushing 4. Therefore, the thief still cannot know which position the opening 44 of the lock bushing 4 corresponds to. In this way, the user 30 only needs to obtain the "inner codes" of the memory combination lock, align the limit protrusion 502 of each limit plate 53, 55, 51, and 57 with each other, and then sequentially turning each rotary disk 3 to the corresponding position according to the "inner codes" of the memory combination lock, the password can be retrieved. For example: if the "inner codes" of the memory combination lock are "3, 5, 1, 7", then turn the leftmost rotary disk 3 downward (clockwise) three times (as shown in FIGS. 15 and 16), the opening 44 of the lock bushing 4 can be rotated to the position of aligning the limiting convex strip 71 of the spindle 7. Sequentially, turn the second rotary disk 3 on the left downward five times (as shown in FIG. 17), turn the third rotary disk 3 on the left downward once (as shown in FIG. 18), and turn the rightmost rotary disk 3 downward seven times (as shown in FIG. 19). The opening 44 of each lock bushing 4 can be aligned with each other to achieve the purpose of retrieving the unlocking code. It can also rotate in the opposite direction, turn the leftmost rotary disk 3 upward (counterclockwise) seven times. By analogy, turn the second rotary disk 3 on the left upward five times, the third rotary disk 3 on the left upward nine times, and the rightmost rotary disk 3 upward three times. Rotate each rotary disk 3 upwards in sequence the corresponding number of times to align the opening 44 of each lock bushing 4. In addition, the present invention can also use the sum of the corresponding digit 30 on the rotary disk 3 after alignment of each limit plate 5 and the corresponding "inner codes" to take the single digit. In this way, it is the correct unlocking password. For example, if the digit 30 on rotary disk 3 is (3), the inner code is (7), and the total is "10", taking the single digit, the correct password for rotary disk 3 is "0", so turn the digit 30 on rotary disk 3 to (0). Or if the digit 30 on rotary disk 3 is (8), the inner code is (7), and the total is "15", taking the single digit, the correct password for rotary disk 3 is "5", so turn the digit 30 on rotary disk 3 to (5) to retrieve the original password. By analogy, the thief cannot guess the "inner codes" of the memory combination lock, which can truly prevent the thief from peeking into the corresponding groove 45 of the lock bushing 4 to unlock the lock. With the memory combination lock structure of the present invention, a thief cannot know whether the groove on the lock bushing 4 is the correct corresponding groove 45 or a pseudo corresponding groove 46 unless the "inner codes" of the memory combination lock is obtained. It is difficult to guess the unlocking password, which has the effect of truly preventing prying eyes from unlocking and retrieving the password.

In summary, the present invention has indeed achieved the expected objects and effects, and is more ideal and practical than those in the art. The above-mentioned embodiment is only specific descriptions for the preferred embodiments of the present invention, the embodiment is not intended to limit the scope of the patent application of the present invention, and all other equivalent changes and modifications accomplished without departing from the technical means disclosed in the present invention shall be covered by the present application.

What is claimed is:

1. A memory combination lock, comprising:

a lock base, wherein the lock base has an accommodating groove arranged thereon, the lock base has a recessed groove provided at one end thereof, the accommodating groove of the lock base has a first protruding body protruding therein at a position corresponding to the recessed groove, an inner wall of the recessed groove has a first through hole disposed thereon and two insertion slots oppositely disposed thereon, the first through hole and the two insertion slots are connected with the accommodating groove, the lock base has a notch disposed thereon and connected with the first through hole, the accommodating groove of the lock base has a second protruding body located inwardly at a position corresponding to the first protruding body, the second protrusion has a second through hole disposed therein, the second through hole has a slot disposed thereon;

a set knob, located in the recessed groove of the lock base, wherein the set knob has a convex lump disposed on an outer end surface thereof, the convex lump has a cut slot arranged thereon, the set knob has a restricting protrusion additionally provided on the outer end surface thereof, the set knob has two guide cut slots arranged oppositely on the other end thereof, and one side of the two guide cut slots is set as an arc cut surface;

a stopper, sleeved on the first protruding body of the lock base, wherein the stopper has a through-hole disposed thereon, the stopper has two guide tabs protruding from one end thereof oppositely, the two guide tabs are respectively inserted into the two insertion slots of the lock base and are arranged in the two guide cut slots of the set knob, the opposite side edges of the two guide tabs are formed as arc surfaces, the stopper has positioning cut slots relatively arranged on a wall thereof, and one of the positioning cut slots is aligned with the notch of the lock base;

a set of dial units, arranged in the accommodating groove of the lock base, wherein the set of dial units is composed of several rotary disks, several lock bushings and several limit plates, each of the rotary disks has ten digits (0~9) evenly surrounding an outer wall thereof, each of the rotary disk has a plurality of positioning stuck slots arranged around one end of an inner wall surface thereof, each of the rotary disks has a recessed slot provided at the other end thereof, each of the rotary disks has a penetration hole disposed in the middle thereof, each of the lock bushings is respectively located in each rotary disk, the lock bushings have a large diameter wall and a small diameter wall respectively provided on an outer wall surface thereof, the small diameter wall is penetrated through the penetration hole of the rotary disk, each of the lock bushings has a big through hole and a small through hole respectively disposed therein, the small through hole has an opening disposed thereon, each of the lock bushings has a corresponding groove provided on the outer wall surface thereof at a position corresponding to the opening, each of the lock bushings has several position protrusions arranged on the outer wall surface thereof for being snapped into the positioning stuck slots of the rotary disk, each of the limits plates placed along one side of the rotary disk is designed in ten types and has a passing hole in the middle thereof, an inlay embedded on the limit plates and protruded from the passing hole thereof is engaged into a corresponding groove of the lock bushings, and an limit protrusion disposed on an outer peripheral wall of the limit plates respectively accordingly to the position of one out of the ten digits (0~9) on the rotary disks, so that the limit protrusions of the ten limit plates correspond to the positions of the ten digits on the rotary disks respectively, each of the limit plates is partially inserted in the recessed slot of each of the rotary disks;

a spring, sleeved on the second protruding body of the lock base;

a spindle, passed through the stopper and the set of dial units, wherein the spindle has a push block protrudingly disposed thereon, the push block has a limiting convex strip provided on one side thereof, and the limiting convex strip has several cut grooves provided thereon; and an upper case, covered on the lock base, wherein the upper case has a chute for the push block of the spindle to pass through and provided on a top surface thereof, the upper case has a through opening provided on the top surface thereof corresponding to the position of each of the rotary disks of the set of dial units, the upper case has a penetration opening provided on one end surface thereof, the penetration opening of the upper case is used for the convex lump of the set knob to pass through, the upper case has an arc groove provided on an inner wall thereof, the arc groove is used for inserting the restricting protrusion of the set knob.

2. The memory combination lock, as recited in claim 1, wherein the lock base has several protrusions equidistantly disposed in the accommodating groove thereof, wherein a limiting groove is formed between the protrusion and the protrusion.

3. The memory combination lock, as recited in claim 1, wherein the lock base has a positioning groove provided at a bottom thereof, wherein the upper case has a positioning inlay disposed on an inner wall surface thereof corresponding to the positioning groove of the lock base.

4. The memory combination lock, as recited in claim 1, wherein the positions of the limit protrusions of the ten types of limit plates are respectively: the limit protrusion of the first limit plate corresponds to the position of the digit (1) on the rotary disk, the limit protrusion of the second limit plate corresponds to the position of the digit (2) on the rotary disk, the limit protrusion of the third limit plate corresponds to the position of the digit (3) on the rotary disk, the limit protrusion of the fourth limit plate corresponds to the position of the digit (4) on the rotary disk, the limit protrusion of the fifth limit plate corresponds to the position of the digit (5) on the rotary disk, the limit protrusion of the sixth limit plate corresponds to the position of the digit (6) on the rotary disk, the limit protrusion of the seventh limit plate corresponds to the position of the digit (7) on the rotary disk, the limit protrusion of the eighth limit plate corresponds to the position of the digit (8) on the rotary disk, the limit protrusion of the ninth limit plate corresponds to the position of the digit (9) on the rotary disk, the limit protrusion of the tenth limit plate corresponds to the position of the digit (0) on the rotary disk.

5. The memory combination lock, as recited in claim 1, wherein the lock bushing has at least one pseudo corresponding groove disposed on the outer wall surface thereof.

6. The memory combination lock, as recited in claim 1, wherein the upper case has corresponding marks arranged between the through openings on the top surface thereof.

7. The memory combination lock, as recited in claim 1, wherein the upper case has a lock serial number arranged thereon.

* * * * *